June 5, 1945. J. W. BAYLES 2,377,601
CONTROL OF RESISTANCE WELDING MACHINES
Filed Dec. 11, 1942 2 Sheets-Sheet 1

Inventor
John H. Bayles
By
Watson, Cole, Grindle & Watson
Attorney

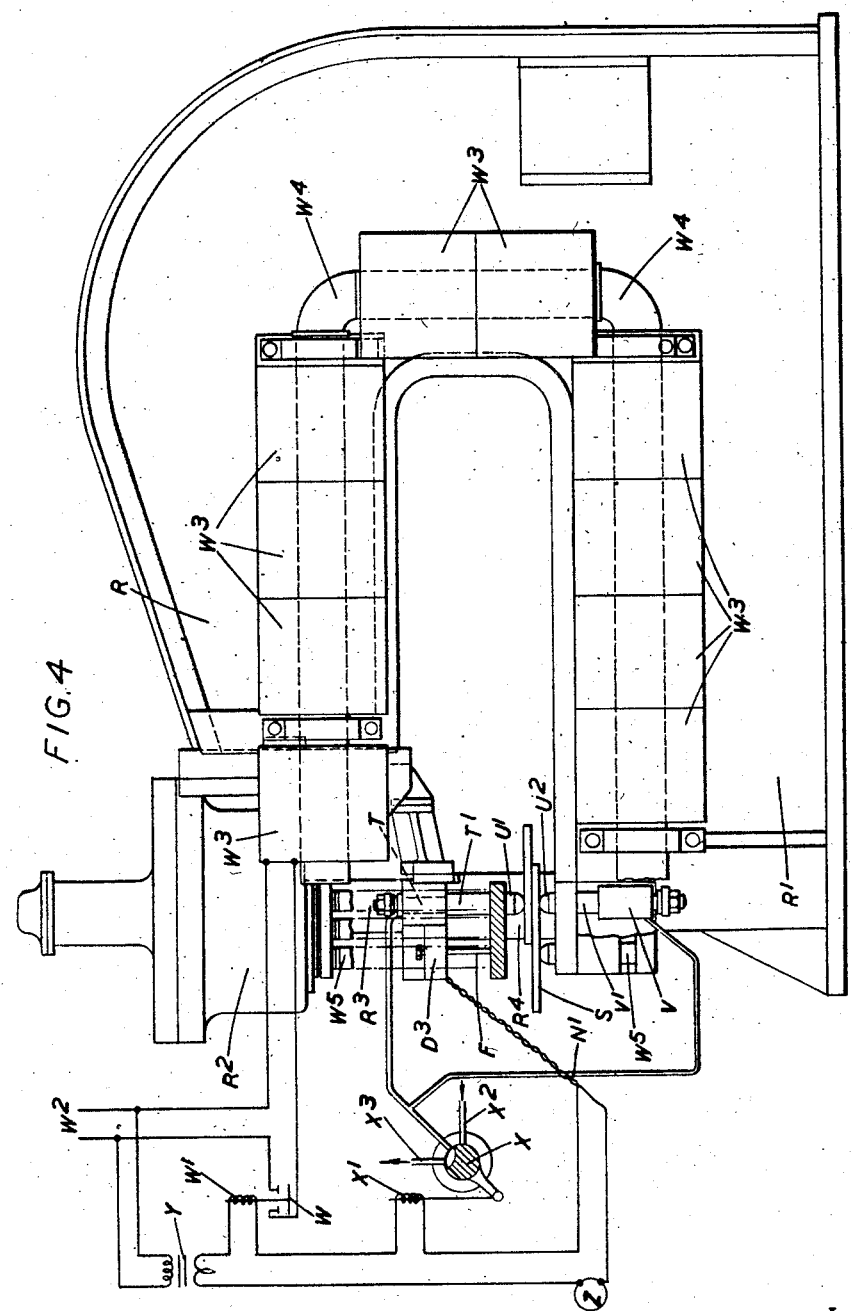

Patented June 5, 1945

2,377,601

UNITED STATES PATENT OFFICE 2,377,601

CONTROL OF RESISTANCE WELDING MACHINES

John Wallis Bayles, Roker, Sunderland, England, assignor to A. Reyrolle & Company Limited, Hebburn-on-Tyne, England, a company of Great Britain Application December 11, 1942, Serial No. 468,681
In Great Britain January 2, 1942

8 Claims. (Cl. 219—4)

This invention relates to the control of resistance welding machines.

The usual automatic control schemes for spot-welders incorporate some form of timing control and the time-interval setting is varied to suit the work being done. The results must vary, however, due to supply voltage variation, degree of contact obtained, volume of cooling water used, gradual deterioration of the electrodes, variation of electrode pressure where hydraulically or pneumatically controlled, and any similar factors. The time setting must presumably be chosen to give a good weld under the worst conditions and must therefore be too long on the average, involving waste of energy and working time.

Experiments have now shown that the state of the weld can be determined from the small electrode movements which occur during a welding operation and that if the welding period is determined from these movements the time and energy expended on each individual weld can be made to approximate to the correct and minimum value, which evidently gives more economical working conditions.

Thus according to the present invention means is provided responsive to the alteration in dimensions of the parts being united when heated by the current passing through electrodes pressing against the parts. For example the means may respond to the movement of one electrode relatively to the other or to the frame when the parts pressed between them and heated by current through them first expand and then become plastic at the point of weld. Such means may be arranged automatically to interrupt the current when the material of the work under the electrode becomes plastic and allows the electrode to start sinking into it. Alternatively or in addition it may serve to relieve the pressure of the electrodes on the work.

Figure 1:
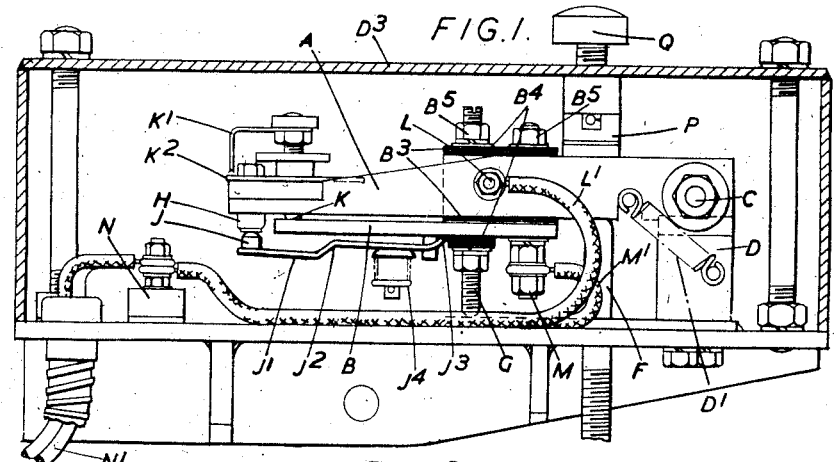

The invention may be carried into effect in various ways but one specific embodiment will be described by way of example with reference to the accompanying drawings, in which Figure 1 is a sectional side elevation, Figure 2 a sectional plan and Figure 3 a sectional end elevation, of one form of contact mechanism for fitting to a resistance welding machine and Figure 4 is a diagram indicating the application of the mechanism to the machine.

The contact mechanism comprises an upper lever A and a lower lever B coaxially pivoted at C on a pair of fixed lugs D. As shown in Figure 2 the upper lever A is actually constituted by two arms with part of the lower lever B situated between them. The lower lever is freely pivoted and is urged downwardly by tension springs $D^1$ whilst the upper lever A is held against the lugs D by spring washers $D^2$ which cause it to remain in any position to which it is moved.

A push rod F, mounted on a flange which forms part of the upper electrode, as indicated in Figure 4, engages the lower lever B on its underside at a point not far from the pivot so that the movement of the end of the lever is multiplied as compared with that of the push rod and electrode. To limit downward movement of the lever, for example when the mechanism is detached from the machine, the lower lever carries an adjustable stop G. The mechanism is mounted in a casing $D^3$.

At their free ends the two levers carry a pair of cooperating contacts. The upper contact H is rigidly mounted on the upper lever whilst the lower contact J is carried at the end of a blade $J^1$ which is held into contact with the lower lever B at two points $J^2$ and $J^3$ by a spring $J^4$ at an intermediate point. Hence if the contact J is pressed downwardly away from the lever B it will be urged upwardly by the spring $J^4$ until the parts engage at the point $J^2$ but no further.

An unyielding abutting engagement between the two levers is provided by a stop K in the form of a screw provided with a pointer $K^1$ co-operating with a scale $K^2$. The lower end of this screw engages the lower lever.

The lower lever B is actually in two parts $B^1$ and $B^2$ insulated from one another by insulating strips $B^3$ and insulating bushes $B^4$ surrounding the bolts $B^5$ which hold the two parts together. Terminals L and M on the two levers respectively are connected by leads $L^1$ and $M^1$ to a terminal block N to which external leads $N^1$ are connected.

The upper lever A carries a relatively stiff leaf spring P which cooperates with a resetting knob Q to enable the upper lever to be pressed down into contact with the lower one.

The operation of the mechanism is as follows. Prior to a welding operation the resetting knob is depressed to lower the upper lever towards the lower lever. The pressure between the contacts causes the lower one to yield until the stop K engages the lower lever.

When current is first applied the plates heat up and expand and the electrodes are forced apart to a small extent. As heating proceeds, however, a molten pool is formed between the plates, and the plate under each electrode is softened. When this process has developed sufficiently far the electrode pressure is sufficient to start indentation of the plates and the outward electrode motion first ceases and then reverses, i. e., the electrodes start to move inwards. When this stage has been reached it has been found that the weld has grown to about maximum diameter and that further heating is wasteful. Furthermore, deep indentation is undesirable because of the mechanical weakening of the plates thereby produced. It is therefore advantageous to utilise the reversal of electrode motion to switch off the welding current, and evidently also this will always give a finished weld, i. e., the time interval required per weld may vary somewhat but the welds obtained will always be in the same state of completion.

Thus the initial expansion of the work first causes the push rod F to raise the lower lever and with it the upper lever. When the material of the work under the electrode softens the electrode begins to move down again and the lower lever follows it under the action of the springs $D^1$ whilst the upper lever stays where it is. After a predetermined downward movement of the electrode the lower lever engages the blade $J^1$ at the point $J^2$ and the contacts separate. The extent of the downward movement which precedes contact separation can be adjusted by turning the screw K.

The manner in which the mechanism is mounted on and controls the welding machine is shown purely diagrammatically in Figure 4. The welding machine may be of known construction embodying features described for example in United States Patent No. 2,280,369. It comprises a pair of arms R and $R^1$ extending above and below the work S. The upper arm carries a cylinder $R^2$ for a main ram $R^3$ which carries a clamping block $R^4$ and also carries a cylinder T for an auxiliary ram $T^1$ which carries the upper of two electrodes $U^1$ and $U^2$ the latter being carried by a ram $V^1$ working in a fixed cylinder V.

Figure 2:
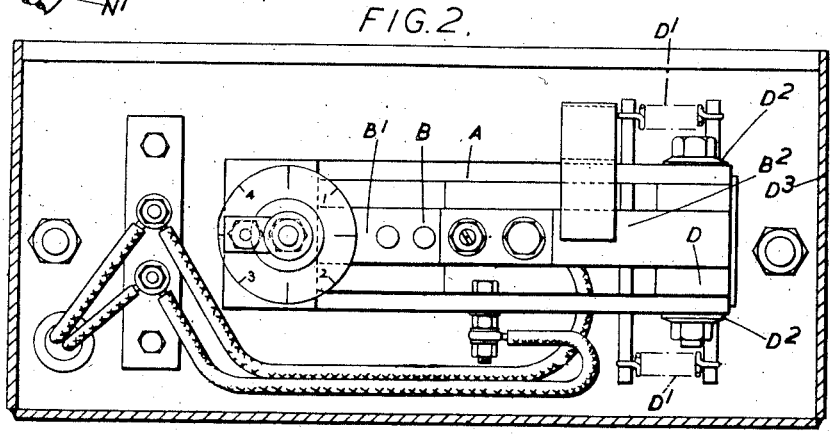
Figure 3:
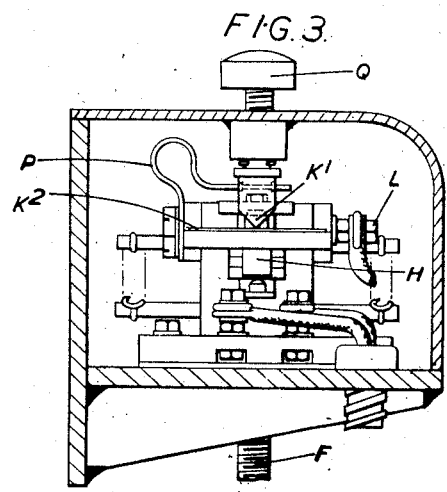

The contact mechanism shown in Figures 1–3 is mounted on the main ram $R^3$ or cylinder T and the lower end of the push rod F is secured to the ram $T^1$ so as to move with the upper electrode. The leads $N^1$ from the contact mechanism are shown diagrammatically as connected in series with the coil $W^1$ of a relay W, the coil $X^1$ of a solenoid-operated valve X, a source of electric current indicated as a transformer Y, and a current indicator Z. The relay W controls the current from a main supply $W^2$ to the primary windings of a number of transformers $W^3$ whose common straight-through secondary conductor $W^4$ offset laterally from the arms R and $R^1$ constitutes the major part of the welding current circuit and is connected at its ends by flexible leads $W^5$ (shown broken away for clarity) to the electrodes $U^1$ and $U^2$. Hence opening of the relay cuts off the supply of welding current. In actual practice the relay would conveniently operate the supply switch.

The solenoid-controlled valve X serves to connect the cylinders T and V alternatively to a source of hydraulic pressure $X^2$ when energised or to exhaust $X^3$ when released. Hence release of this solenoid cuts off the electrode pressure on the work.

It will be appreciated that the invention is not limited to the particular arrangement indicated in the drawings. For example the contact mechanism described may control either the solenoid-controlled valve or the contactor instead of both. Either the welding current or the supply of pressure may be controlled directly by mechanical means responsive to electrode movement. Again the means responsive to electrode movement or change of dimensions of the work may serve merely to give an indication to the operator (as by the indicator Z) without actually performing any automatic controlling function. Moreover the mechanism responsive to electrode movement may respond to relative movement between the electrodes rather than between one electrode and the frame, and the mechanism may take various forms and may for example embody means such as a roller or ball free wheel to prevent reverse movement.

Alternatively the relative movement of the parts may be arranged to control the passage of a beam of light to a photo-electric cell, which in turn may effect the required control or indication.

What I claim as my invention and desire to secure by Letters Patent is:

1. Apparatus for controlling a resistance welding machine including an electric circuit and a pair of electric contacts connected in said circuit and operatively connected to one of the electrodes so that the movement of the electrode in one direction during the initial expansion of the work causes both contacts to move in unison in engagement whereas the reverse movement causes them to separate and interrupt the circuit and means for adjusting the extent of the reverse movement of said electrode from the point of maximum expansion required to produce the separation of the contacts.

2. Apparatus for controlling a resistance welding machine including an electric circuit, a pair of contacts connected in said circuit, friction means tending to hold one of said contacts in any position in which it is placed, and an operative connection between the other contact and one of the electrodes so that the said contact moves towards the companion contact and by engagement moves the latter as the electrode moves in one direction during the initial expansion of the work but moves away leaving the companion contact where it is and interrupting the circuit when the electrode moves in the reverse direction as the work becomes plastic.

3. Apparatus for controlling a resistance welding machine comprising a pair of relatively movable members, a unidirectional operative connection between one of said members and one of the welding electrodes producing no relative movement between the members as the electrode moves back due to expansion of the work when the heating begins, but producing relative movement between them as it thereafter moves forward when the work softens, and switch means operated by said relative movement to control the energizing of said electrodes, whereby said relative movement may actuate said switch at any point during said heating after the point of maximum expansion.

4. Apparatus for controlling a resistance welding machine comprising a pair of movably mounted members, an operative connection between said members and one of the welding electrodes serving to move both said members simultaneously in the same direction when the electrode moves back as the work expands during the welding operation but to move only one of them, thereby producing relative movement between them, when the electrode thereafter moves forward as it sinks into the work, and switch means operated by said relative movement between said members to control the energizing of said electrodes, whereby said relative movement may actuate said switch at any point during said sinking after the point of maximum expansion.

5. Apparatus for controlling a resistance welding machine comprising a pair of relatively movable members, a unidirectional operative connection between one of said members and one of the welding electrodes producing no relative movement between the members as the electrode moves back due to expansion of the work when the heating begins, but producing relative movement between them as it thereafter moves forward when the work softens, and means, operated by said relative movement, for automatically interrupting the welding current at any point after the point of maximum expansion is reached during the heating.

6. Apparatus for controlling a resistance welding machine comprising a pair of relatively movable members, a unidirectional operative connection between one of said members and one of the welding electrodes producing no relative movement between the members as the electrode moves back due to expansion of the work when the heating begins, but producing relative movement between them as it thereafter moves forward when the work softens, and means, operated by said relative movement, for automatically relieving the pressure of the electrode on the work at any point after the point of maximum expansion during the heating.

7. Apparatus for controlling a resistance welding machine including an electric circuit and a pair of electric contacts connected in said circuit, means for closing said contacts by the time the welding operation begins, means operatively connected with said contacts and at least one of said electrodes for maintaining said contacts closed upon movement of the electrodes apart during the initial expansion of the work, and means for effecting the separation of said contacts to break the heating circuit at a point during the heating later than the point of maximum expansion of the work but prior to the point of sinking of the electrode to an amount equal to such maximum expansion.

8. Apparatus for controlling a resistance welding machine including an electric circuit and a pair of electric contacts connected in said circuit, means for closing said contacts by the time the welding operation begins, means operatively connected with said contacts and at least one of said electrodes for maintaining said contacts closed upon movement of the electrodes apart during initial expansion of the work, means for effecting the separation of said contacts to break the heating circuit at a point during the heating later than the point of maximum expansion of the work but prior to the point of sinking of the electrode to an amount equal to such maximum expansion, and means for adjusting at least one of said contacts to predetermine the point of separation and cut-off.

JOHN WALLIS BAYLES.